(12) United States Patent
Lee

(10) Patent No.: US 10,761,770 B2
(45) Date of Patent: Sep. 1, 2020

(54) DATA MANAGEMENT METHOD AND APPARATUS USING BUFFERING

(71) Applicant: SAMSUNG ELECTRONICS CO., LTD., Suwon-si (KR)

(72) Inventor: Jongwook Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 15/186,870

(22) Filed: Jun. 20, 2016

(65) Prior Publication Data

US 2017/0192717 A1    Jul. 6, 2017

(30) Foreign Application Priority Data

Jan. 6, 2016    (KR) .......................... 10-2016-0001439

(51) Int. Cl.
| | | |
|---|---|---|
| *G06F 3/06* | (2006.01) | |
| *G06F 13/12* | (2006.01) | |

(52) U.S. Cl.
CPC .......... *G06F 3/0656* (2013.01); *G06F 3/0605* (2013.01); *G06F 3/0631* (2013.01); *G06F 3/0673* (2013.01); *G06F 13/126* (2013.01); *Y02D 10/14* (2018.01)

(58) Field of Classification Search
CPC .... G06F 3/0656; G06F 3/0605; G06F 3/0631; G06F 3/0673
See application file for complete search history.

(56) References Cited

U.S. PATENT DOCUMENTS

| | | | |
|---|---|---|---|
| 6,683,889 B1 | 1/2004 | Shaffer et al. | |
| 7,231,340 B2 | 6/2007 | Burchard et al. | |
| 7,328,433 B2 | 2/2008 | Tian et al. | |
| 7,359,321 B1* | 4/2008 | Sindhu ................... | H04L 47/10 370/230 |
| 8,572,421 B2 | 10/2013 | de Cesare et al. | |
| 8,661,407 B2 | 2/2014 | Seigemund et al. | |
| 8,780,120 B2 | 7/2014 | Sagall et al. | |
| 2007/0076735 A1* | 4/2007 | Soo ........................ | G06F 13/385 370/412 |
| 2007/0239399 A1 | 10/2007 | Sheynblat et al. | |
| 2008/0063004 A1* | 3/2008 | Himberger .............. | H04L 47/10 370/413 |
| 2008/0134185 A1* | 6/2008 | Fedorova .............. | G06F 9/4881 718/102 |
| 2009/0147796 A1* | 6/2009 | Chow .................. | H04L 47/6215 370/413 |

(Continued)

FOREIGN PATENT DOCUMENTS

| | | | |
|---|---|---|---|
| EP | 2 730 216 A1 | 5/2014 | |
| JP | 2007-235217 A | 9/2007 | |
| WO | WO-2015178926 A1 * | 11/2015 | ......... G06F 12/0862 |

OTHER PUBLICATIONS

European Search Report dated May 26, 2017 for the corresponding European Application No. 16186467.3 (8 pages in English).

*Primary Examiner* — Tim T Vo
*Assistant Examiner* — Harry Z Wang
(74) *Attorney, Agent, or Firm* — NSIP Law

(57) ABSTRACT

A data management method includes allocating a buffer for an application based on request information associated with data requested by the application, storing sensor data corresponding to the request information in the buffer, and transferring the sensor data stored in the buffer to the application.

23 Claims, 14 Drawing Sheets

(56) References Cited

U.S. PATENT DOCUMENTS

| | | | |
|---|---|---|---|
| 2011/0176554 A1* | 7/2011 | Yamada | H04L 47/17 370/412 |
| 2012/0203997 A1 | 8/2012 | Block | |
| 2013/0117769 A1* | 5/2013 | Sharma | G06F 1/3293 719/328 |
| 2013/0165181 A1* | 6/2013 | Hasegawa | G06F 1/324 455/556.1 |
| 2013/0321167 A1 | 12/2013 | Kohn et al. | |
| 2013/0326529 A1* | 12/2013 | Augenstein | G06F 9/4881 718/103 |
| 2014/0023087 A1* | 1/2014 | Czompo | H04W 4/02 370/465 |
| 2015/0236973 A1* | 8/2015 | Jackson | G06Q 10/06 709/226 |
| 2015/0317230 A1* | 11/2015 | Le Grand | G06F 11/3476 702/187 |
| 2016/0127667 A1* | 5/2016 | Lin | H04N 5/3675 348/246 |
| 2016/0261274 A1* | 9/2016 | Tidwell | G06F 1/324 |
| 2017/0052736 A1* | 2/2017 | Butt | G06F 12/0862 |
| 2017/0163734 A1* | 6/2017 | Basu | H04L 67/12 |
| 2017/0369127 A1* | 12/2017 | Cusano | B63B 9/003 |

\* cited by examiner

DATA MANAGEMENT METHOD AND APPARATUS USING BUFFERING

CROSS-REFERENCE TO RELATED APPLICATIONS

This application claims the benefit under 35 USC 119(a) of Korean Patent Application No. 10-2016-0001439 filed on Jan. 6, 2016 in the Korean Intellectual Property Office, the entire disclosure of which is incorporated herein by reference for all purposes.

BACKGROUND

1. Field

The following description relates to a data management method using buffering. The following description also relates to a data management apparatus using buffering.

2. Description of Related Art

Based on diversified types of sensors, devices and applications for providing information by applying data received from various sensors are being provided. In a firmware system, for example, such devices are configured to enable an application to directly control a sensor to collect data and manage a memory for storing the data. The application may find it difficult to be aware of a type of data collected by another application and a sensor from which the collected data is received. Thus, a device that implements a general firmware system may be inappropriate to efficiently manage data and power in a device overall.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a data management method includes allocating a buffer for an application based on request information associated with data requested by the application, storing sensor data corresponding to the request information in the buffer, and transferring the sensor data stored in the buffer to the application.

The request information may include information including at least one of a type of the data requested by the application, a type of processing to be performed on the data, and a quantity of the data.

The storing may include storing the sensor data corresponding to the request information in the buffer based on characteristic information of a corresponding sensor and the request information.

The characteristic information may include at least one of a type of the sensor, a sampling rate of the sensor, and a resolution of the sensor.

The buffer may include at least one line and at least one channel.

The buffer may include a first line and a second line, and sensor data may be received and stored in the second line while previously received and stored sensor data in the first line is transferred to the application.

The buffer may include a first channel in which a first processing is performed on first sensor data and resulting processed first sensor data is stored, and a second channel in which a second processing is performed on second sensor data and resulting processed second sensor data is stored.

The buffer may include a first buffer to store first sensor data generated by a first sensor and a second buffer to store second sensor data generated by a second sensor.

The data management method may further include synchronizing the first buffer and the second buffer.

The synchronizing may include discarding data received in the first buffer until an amount of data corresponding to a preset ratio is stored in the second buffer after the amount of data corresponding to the preset ratio is stored in the first buffer.

The synchronizing may include storing data received in the first buffer in a spare buffer until an amount of data corresponding to a preset ratio is stored in the second buffer after the amount of data corresponding to the preset ratio is stored in the first buffer.

The data management method may further include generating a virtual sensor configured to generate secondary data based on the sensor data.

The virtual sensor may be configured to generate the secondary data based on an output of the application.

The data management method may further include allocating a second buffer for a second application that requests the secondary data, storing the secondary data in the second buffer, and transferring the secondary data stored in the second buffer to the second application.

The data management method may further include controlling an operational speed of a processor based on an execution time during which the application processes the sensor data and an execution time limit of the application.

The controlling of the operational speed may include acquiring the execution time by measuring a time used by the application to process the sensor data at a current operational speed, decreasing the operational speed of the processor in response to the execution time being determined to be less than the execution time limit, and increasing the operational speed of the processor in response to the execution time being determined to be greater than the execution time limit.

The data management method may further include processing the sensor data based on the request information before transfer to the application.

The processing may include performing at least one of filtering, delaying, differentiation, interpolation, and decimation on the sensor data.

The transferring may include transferring the sensor data stored in the buffer to the application in response to a cumulative amount of the sensor data in the buffer satisfying an amount of the data requested by the application.

In another general aspect, a computer program is embodied on a non-transitory computer readable medium, the computer program being configured to control a processor to perform the method described above.

In another general aspect, a data management apparatus includes a buffer manager configured to allocate a buffer for an application based on request information associated with data requested by the application, a sensor managing device configured to store sensor data corresponding to the request information in the buffer, and a processing device configured to transfer the sensor data stored in the buffer to the application.

The data management apparatus may further include a memory configured to store instructions to be executed by the processing device.

The request information may include information comprising at least one of a type of the data requested by the application, a type of processing to be performed on the data, and a quantity of the data.

The storing may include storing the sensor data corresponding to the request information in the buffer based on characteristic information of a sensor and the request information.

The buffer may include at least one line and at least one channel.

The buffer may include a first buffer to store first sensor data generated by a first sensor and a second buffer to store second sensor data generated by a second sensor.

The buffer managing device may be further configured to synchronize the first buffer and the second buffer.

The processing device may be further configured to generate a virtual sensor configured to generate secondary data based on the sensor data.

The data management apparatus may further include a speed control device configured to control an operational speed of the processor based on an execution time during which the application processes the sensor data and an execution time limit of the application.

The processing device may be further configured to process the sensor data based on the request information.

In another general aspect, a data management method includes generating a virtual sensor configured to generate secondary data based on measured sensor data, allocating a buffer for an application that requests the secondary data, storing the secondary data in the buffer; and transferring the secondary data stored in the buffer to the application.

The virtual sensor may be configured to generate the secondary data based on an output of another application that requested the measured sensor data.

In another general aspect, an electronic device includes a sensor configured to output sensor data associated with a biosignal, and a data management apparatus configured to provide biometric information to a user based on the sensor data, including a buffer managing device configured to allocate a buffer for an application based on request information associated with data requested by the application, a sensor managing device configured to store sensor data corresponding to the request information in the buffer, and a processing device configured to transfer the sensor data stored in the buffer to the application.

The electronic device may further include a memory configured to store instructions to be executed by the processing device.

In another general aspect, a data management method includes receiving sensor characteristic information from sensors, receiving respective application request information from applications, allocating one or more buffers for each of the applications based on the sensor characteristic information and the respective application request information, storing sensor data received from the sensors in the buffers, and respectively transferring the sensor data stored in the buffers to the applications.

The storing may include determining which of the applications is subscribing to corresponding sensor data of which of the sensors based on the sensor characteristic information and the respective application request information, and storing the corresponding sensor data in a buffer allocated for the application.

The data management method may further include generating a processing chain for each of the applications based on the respective application request information, and processing sensor data corresponding to the respective application request information using the processing chains, wherein the storing comprises storing the respective processed sensor data in a selected buffer corresponding to the application request information.

The allocating may include determining a type of buffer to allocate for each of the applications based on the respective application request information, and the type of buffer may be determined based on a number of lines and channels included in a buffer.

In another general aspect, a data management apparatus includes a sensor managing device configured to generate a virtual sensor configured to generate secondary data based on sensor data, a buffer managing device configured to allocate a buffer for an application that requests the secondary data, a sensor managing device configured to store the secondary data in the buffer, and a processing device configured to transfer the secondary data stored in the buffer to the application.

The sensor data may represent a biosignal.

The virtual sensor may be configured to generate the secondary data based on an output of another application that requested the sensor data.

The data management apparatus may further include a memory configured to store instructions to be executed by the processing device.

The virtual sensor may derive the secondary data from another secondary data received from another virtual sensor that derived the other secondary data based on the sensor data.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
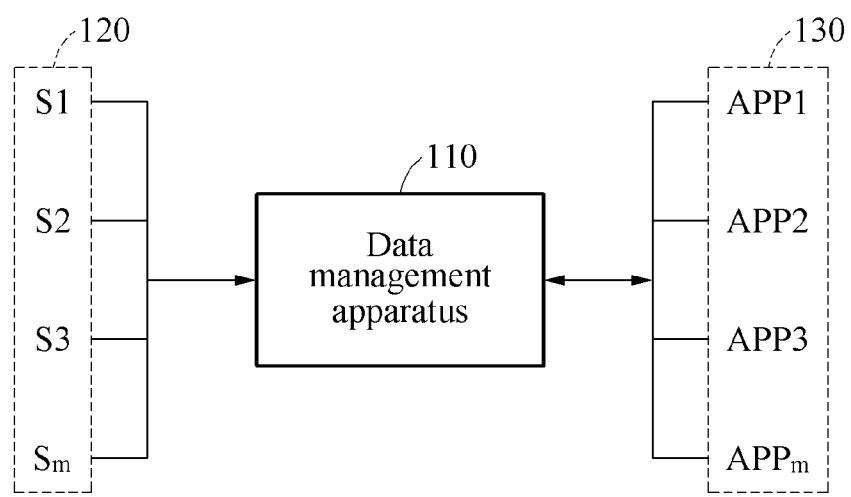
FIG. 1 illustrates an example of a data management apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples are described in detail with reference to the accompanying drawings, wherein like reference numerals in the drawings denote like elements. It is to be understood that, although the terms first, second, etc. may be used herein to describe various elements, these elements should not be limited by these terms. These terms are only used to distinguish one element from another, such as for identification purposes. For example, a first element could also be termed a second element, and, similarly, a second element could also be termed a first element without departing from the teachings of the disclosure.

FIG. 1 illustrates an example of a data management apparatus. A data management apparatus 110 provides sensor data corresponding to data requests of applications 130 to the applications 130. The data management apparatus 110 allocates a buffer for each of the applications 130 in a memory and stores sensor data received from sensors 120 in the buffer. When sensor data corresponding to the requests or requirements of the applications 130 is collected in the buffer, the data management apparatus 110 then transfers the sensor data stored in the buffer to the applications 130.

In an example, the data management apparatus 110, the sensors 120, and the applications 130 may be implemented through a hardware module included in an electronic device embodiment. In such an example, the electronic device may be a portable computing device, for example, a smartphone, a tablet personal computer (PC), and a laptop computer, or a wearable device, for example, a smart watch, a smart band, and a smart wear. However, these are only examples of electronic devices, and other electronic devices are used, as appropriate in other examples. The sensors 120 measure a biosignal of a user. The applications 130 provide information on a body state of the user based on the biosignal received from the sensors 120.

The data management apparatus 110 determines requirements of the applications 130 based on request information from the applications 130. For example, the applications 130 specify desired data using the request information and announce the desired data to the data management apparatus 110 to define for the data management apparatus 110 which information should be provided from which of the sensors 120 to which applications 130. The request information includes information on, for example, a type of data requested by the applications 130, a type of processing to be performed on the data, and a quantity of the data. However, these are only examples of request information, and other information that characterizes aspects of the data to be used by the applications 130 is optionally used in an example. The type of the data indicates which sensor or which type of sensor from which the desired data is output. The applications 130 are able to determine a sensor from which to receive the data based on the type of the data. The quantity of the data indicates a quantity of data by which the data is stored to be transferred. Based on the quantity of data, the applications 130 is able to determine a quantity of data that it should be prepared to receive at a time or limits as to how much data to request. For example, the quantity of data is also indicated by the number of samples per buffer or a size of sample per buffer. Such a quantity helps regulate data flow from the sensors 120 into the applications 130. In an example, the applications 130 initially register request information in the data management apparatus 110 and then update the request information in response to a change in the request information.

The data management apparatus 110 allocates the buffer for each of the applications 130 in the memory based on the request information, and then stores the desired data for the applications 130 in corresponding buffers. For example, when an application APP1 sends a request for acceleration information, the data management apparatus 110 stores acceleration data received from an acceleration sensor, such as an accelerometer, in a buffer corresponding to the application APP1 so as to be provided to the application APP1. For example, the data management apparatus 110 may allocate the buffer and store measured sensor data independent of processes that may be performed with respect to the sensor data by the application APP1.

The data management apparatus 110 identifies sensor data corresponding to the request information based on characteristic information of the sensors 120. In an example, the characteristic information includes at least one of a type of a sensor, a sampling rate of the sensor, and a resolution of the sensor. The data management apparatus 110 stores sensor data corresponding to request information of a corresponding application in a buffer for the application based on the request information of the applications 130 and the characteristic information of the sensors 120. When a quantity of sensor data requested by the predetermined application is collected, the data management apparatus 110 transfers the sensor data to the predetermined application. It is to be understood that the transferring of the sensor data stored in the buffer includes, for example, transferring of the buffer and transferring of information such as a pointer indicating an address of the buffer in which the sensor data is stored. However, other approaches to providing access to the sensor data are used in other examples to facilitate access by the applications 130 to information that is accumulated in the buffer.

The sensors 120 include, for example, a sensor S1 through a sensor $S_m$ as shown in the example of FIG. 1. The sensors 120 detect various targets internal and external to the data management apparatus 110. In an example, the sensors 120 include at least one of, for example, a sensor configured to sense a temperature in a processor, a sensor configured to sense a state of charge (SoC) of a battery, an electrocardiogram (ECG) sensor, a photoplethysmogram (PPG) sensor, an impedance sensor, an acceleration sensor, and a gradient sensor. Here, an ECG sensor records electrical activity of a user's heart, and a PPG sensor provides volumetric measurement of an organ. However, these sensors are only examples of sensors that gather data about the user or the user's surroundings, and other sensors are used in other examples. The sensors 120 communicate with a processor of the data management apparatus 110 through various digital interfaces. Each of the sensors 120 outputs sensor data and then transfers the sensor data to the data management apparatus 110 for further use and analysis.

The applications 130 include, for example, the application APP1 through an application $APP_m$ as shown in the example of FIG. 1. The applications 130 provide various information to a user based on the sensor data that they receive from the data management apparatus 110. For example, the applications 130 provide information based on a biosignal of the user. The applications 130 receive desired data from the data management apparatus 110 by specifying the desired data using the request information, as discussed further above. The data management apparatus 110 identifies the sensor data corresponding to the request information and provides the sensor data to the applications 130. The data management apparatus 110 allocates an exclusive buffer for each of the applications 130, and stores the sensor data corresponding to the request information in a corresponding buffer.

The data management apparatus 110 manages data used by the applications 130 in a unified manner, thereby increasing eases of use and facilitating operation of the applications 130 and accordingly reducing an amount of resources such as power for executing the applications 130. For example, the data management apparatus 110 adjusts a speed of the processor based on an execution time limit of the applications 130 in order to reduce power consumption for executing the applications 130.

In an example, the data management apparatus 110 generates a virtual sensor configured to generate secondary data based on the sensor data. The secondary data is data additionally generated based on the sensor data and including information obtained through a change or transformation of information indicated in the sensor data. Thus, the secondary data is data derived by analysis and processing of the raw sensor data. Accordingly, the secondary data is generated by performing a preset operation on the sensor data output by the sensors 120. For example, a virtual blood pressure sensor configured to generate blood pressure values is generated based on sensor data of an acceleration sensor, a pulse wave sensor, and an ECG sensor. The virtual sensor differs from the sensors 120 that are actually present in that it is only simulated. For example, a configuration of such a virtual sensor may be stored in a form of a module in the data management apparatus 110 or in the memory of an electronic device including the data management apparatus 110. The virtual sensor is also described in further detail later. For example the data management apparatus 110 may generate, allocate a buffer, and store such unified sensor data independent of processes that may be performed on the virtual sensor data by the application.

The data management apparatus 110 processes the sensor data in response to receiving a request from the applications 130. For example, the data management apparatus 110 cancels noise from the sensor data and stores the sensor data from which the noise is canceled. Such processed data may be more useful than the original data in that it may be easier to identify significant information without the presence of noise. Also, when the applications 130 request data from a plurality of sensors, the data management apparatus 110 synchronizes the data received from the plurality of sensors. Such synchronizing potentially helps aspects of using the data that are time-sensitive or need to occur in real-time. Processing and synchronization of sensor data is also described in further detail later. Similar to the above, in an example, the data management apparatus 110 may perform such processes on the sensor data, and such synchronization, independent of processes that may be performed on the sensor data by the applications.

Figure 2:
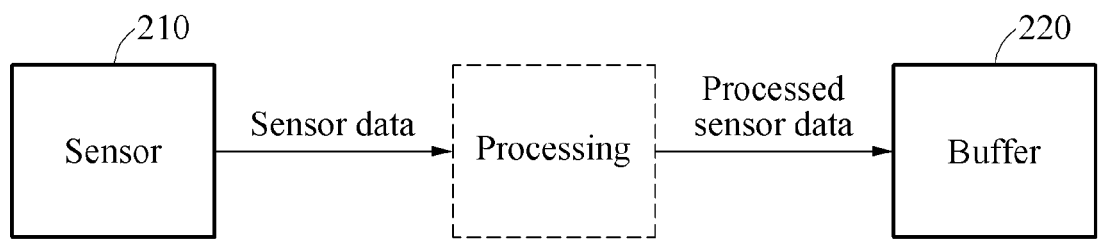
FIG. 2 illustrates an example of a processing and storing of sensor data.

FIG. 2 illustrates an example of processing and storing sensor data. Referring to the example of FIG. 2, a sensor 210 outputs sensor data and a buffer 220 stores processed sensor data. In between the sensor 210 and the buffer 220, a processing of the sensor data occurs, to generate processed sensor data. For example, an application requests processing of predetermined sensor data using request information. For example, the application requests first sensor data in a non-processed state and also second sensor data in a processed state. In an example, based on original respective acceleration data and ECG data from physical sensors, the application measures an ECG of a user when the user is not moving by considering previous acceleration data and the original ECG data together to deduce the ECG of a user when the user is not moving. In this example, the acceleration data is applied supportively to help interpret the ECG data and thus, a required quantity of the acceleration data is relatively smaller in comparison to that of the ECG data. Thus, the application requests ½ decimation to be performed on the acceleration data, such that it is not necessary to sample the acceleration data as frequently as the ECG data is to be sampled, and decimation filters the signal to mitigate distortion. The processing of the sensor data includes, for example, filtering, delaying, differentiation, interpolation, and decimation. Such processing steps are signal processing steps that transform and analyze the raw sensor data in various ways to improve the quality and reliability of the data to help mitigate distortion and noise. In an example, a plurality of processing processes may be applied to the same sensor data. Also, the plurality of processing processes may be applied to the sensor data in various orders. These orders depend on attributes of the data. Accordingly, a processing process of sensor data is managed for each application. The one or more processing processes to be applied to the sensor data is also referred to as, for example, a processing chain for that sensor data. The processing chain is generated for each item of sensor data requested by the processing chain to process that data in a manner suited to the particular data item. For example, in response to a registration of an application, a buffer for the application is allocated and a processing chain for the corresponding buffer is generated.

Figure 3:
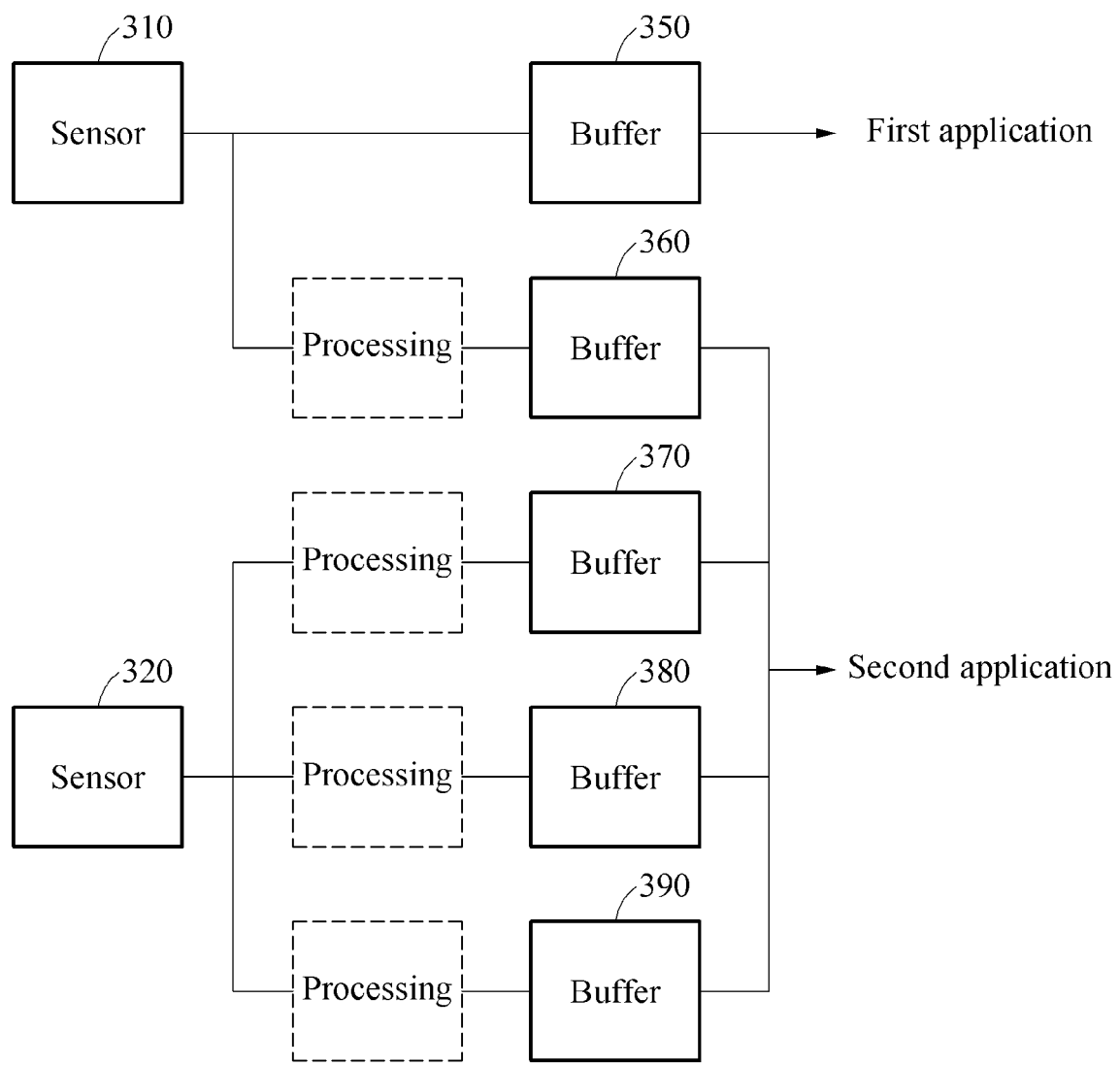
FIG. 3 illustrates an example of a buffer allocation and data transfer.

FIG. 3 illustrates an example of buffer allocation and data transfer. Referring to the example of FIG. 3, a buffer 350 is allocated to a first application and buffers 360, 370, 380, and 390 are allocated to a second application. The buffer 350 stores non-processed sensor data of a sensor 310. The buffer 360 stores sensor processed sensor data of the sensor 310. The buffers 370, 380, and 390 also store processed sensor data of the sensor 320. Different processing is performed on the sensor data stored in each of the buffers 370, 380, and 390. As discussed above, the nature of various sensor data dictates what types of processing are to be used or available for that type of data. For example, sensor data of the sensor 320 to which decimation is applied is stored in the buffer 370, sensor data of the sensor 320 to which filtering is applied is stored in the buffer 380, and sensor data of the sensor 320 to which delaying is applied is stored in the buffer 390. As the foregoing explains, the type of data requested by each of the applications and the type of processing to be performed on the data are determined based on the request information, which helps manage buffering of the data by identifying characteristics of the data and other related information.

Figure 4:
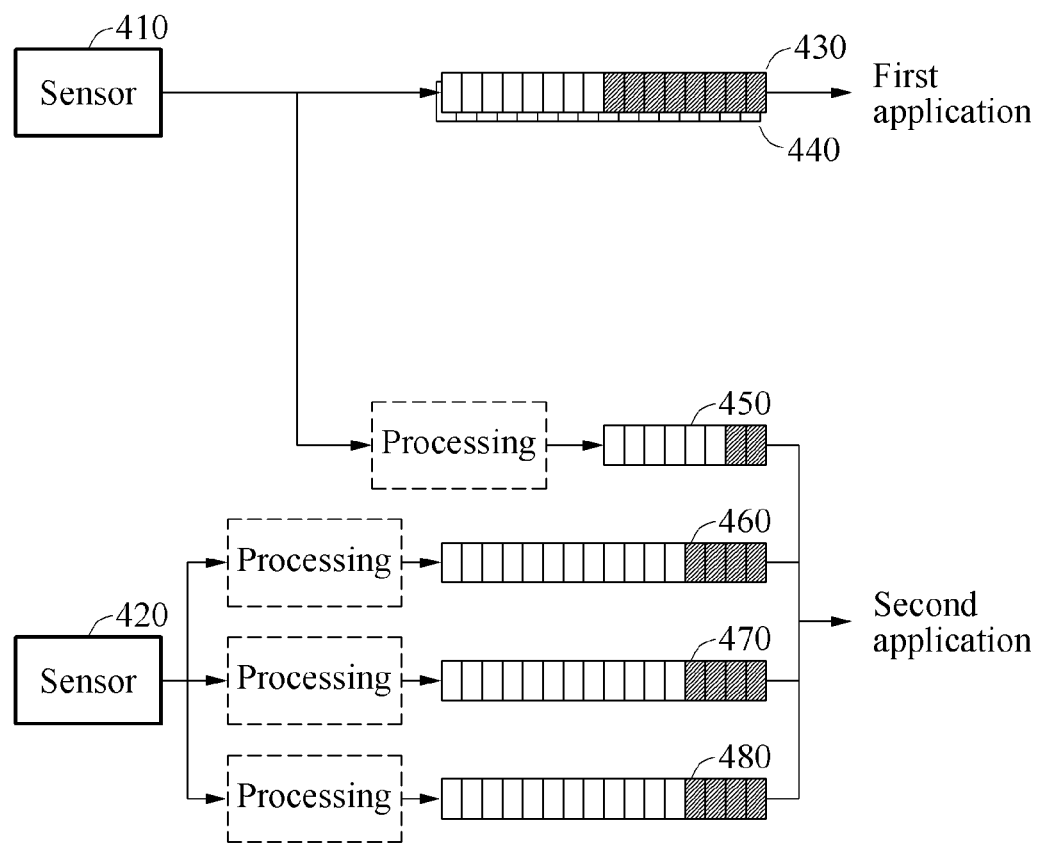
FIG. 4 illustrates an example of a buffer.

FIG. 4 illustrates an example of a buffer. Referring to FIG. 4, a first buffer is allocated for a first application and a second buffer is allocated for a second application. The first buffer includes a first line 430 and a second line 440. The second buffer includes a first channel 450, a second channel 460, a third channel 470, and a fourth channel 480. The first buffer provides sensor data to the first application and the second buffer provides sensor data to the second application.

The first line 430 and the second line 440 store and transfer data alternately. For example, in a first time interval, the first line 430 stores data received from a sensor 410, and the second line 440 transfers data stored in the second line 440 to an application. Also, in a second time interval, the first line 430 transfers data stored in the first line 430 to an application, and the second line 440 stores data received from a sensor 420 in the second line 440. Thus, the first line 430 and the second line 440 take turns between storing and transferring data, so that exactly one of the two lines performs one of these functions at a time. By applying a multi-line data transfer to a buffer, delay in data transmission and data loss may be prevented.

Processed sensor data of the sensor 410 is stored in the first channel 450, and processed sensor data of the sensor 420 is stored in the second channel 460 through the fourth channel 480. In the example of FIG. 4, different processing operations may be performed on pieces of sensor data stored in each of the first channel 450 through the fourth channel 480. For example, sensor data of the sensor 420 to which decimation is applied is stored in the first channel 450. Through the decimation processing, a smaller number of samples may be stored in the first channel 450 when compared to other channels, for example, the second channel 460 through the fourth channel 480. Also, sensor data of the sensor 420 to which filtering is applied is stored in the second channel 460, sensor data of the sensor 420 to which differentiation is applied is stored in the third channel 470, and sensor data of the sensor 420 to which delaying is applied is stored in the fourth channel 480. By applying a multi-channel structure to the buffer, different attributes may be assigned to the same sensor data.

In an example, request information includes information associated with a type of buffer requested by an application. Thus, the application specifies a type of a desired buffer through using the request information. For example, the application requests a multi-line buffer or a multi-channel buffer to be allocated through the request information. Examples of these types of buffers are presented above, with respect to the example of FIG. 4. Also, the application specifies the desired number of lines and/or the desired number of channels through the request information. By specifying these desired numbers, it is possible to help define a buffering approach that is optimal for the data being buffered. Thus, by specifying a type of buffer through the request information, a data management of the application and a design of the application may be performed with increased ease and efficiency.

Figure 5:
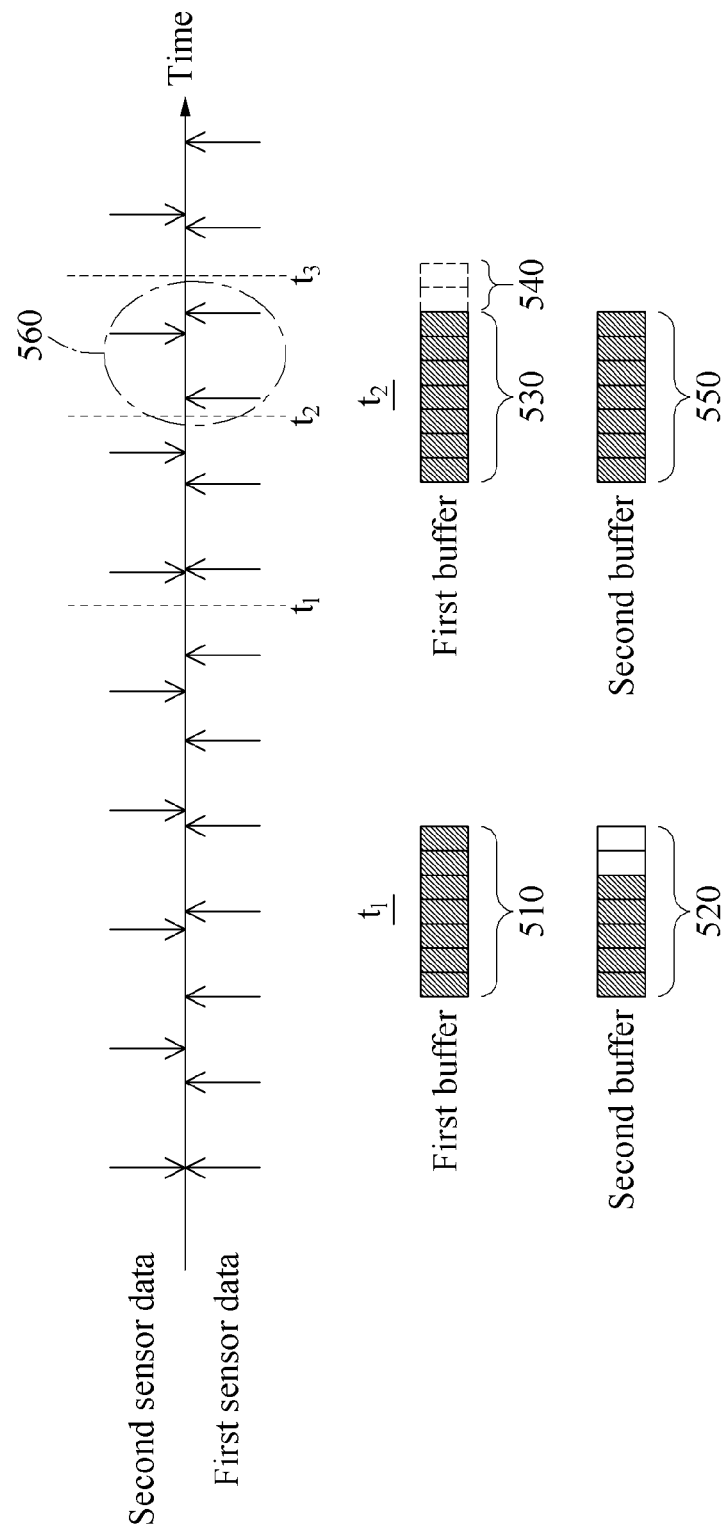
FIG. 5 illustrates an example of synchronization

FIG. 5 illustrates an example of synchronizing. The example of FIG. 5 illustrates a timing of storing first sensor data and a timing of storing second sensor data. The first sensor data is stored in a first buffer and the second sensor data is stored in a second buffer. Even though the two sensors are designed to have the same sampling rate, actual sampling rates of the may differ due to various reasons, for example, a clock drift. A data management apparatus synchronizes the two sensors by compensating for a difference that occurs between sampling rates. The data management apparatus compensates for the difference between sampling rates by discarding a sampling discrepancy that exceeds a preset ratio. As an example, when an application requests first sensor data and second sensor data designed to have a preset ratio of samples from the first sensor and the second sensor, the data management apparatus discards data received in the first buffer or the second buffer after data having exceeding the same ratio is stored in the first buffer and the second buffer. Thus, when an actual sampling rate of the first sensor is higher than an actual sampling rate of the second sensor, the data management apparatus discards data received in the first buffer until a quantity of data corresponding to the preset ratio is stored in the second buffer after the quantity of data corresponding to the preset ratio is stored in the first buffer. By managing received data in this manner, the synchronization is facilitated.

In FIG. 5, the first sensor data is received seven times and the second sensor data is received five times before a time $t_1$. Thus, at the time t1, seven samples 510 are stored in the first buffer and five samples 520 are stored in the second buffer. Also, the first sensor data and the second sensor data are received twice more from the time $t_1$ to the time $t_2$. Thus, at the time $t_2$, the first buffer includes seven samples 530 stored in advance and two samples 540 stored additionally, and seven total samples 550 are stored in the second buffer. When the application requests the first sensor data and the second sensor data so that the ratio of the number of samples between the first sensor data and the second sensor data is to correspond to a ratio of 1:1, the data management apparatus discards the samples exceeding the ratio of 1:1 for synchronization. Through this discarding, the application acquires sensor data synchronized based on the ratio of 1:1.

The samples 530 and the samples 550 are transferred to the application at the time $t_2$ and a time $t_3$. The application performs an operation using the samples 530 and the samples 550 accumulated at the time $t_2$ and the time $t_3$. However, samples received in the first buffer and the second buffer while the operation of the application is performed are discarded. Concisely put, samples received in a timing interval 560 are discarded, such as between the time $t_2$ and the time $t_3$. Data reception restarts at the time $t_3$. The first sensor data received after the time $t_3$ is stored in the first buffer and the second sensor data received after the time $t_3$ is stored in the second buffer, accordingly. However, data loss may be prevented by using an additional buffer. For example, the aforementioned multi-line approach may be used to prevent the data loss, so that while a buffer is transferring its contents, another buffer receives data that would otherwise be discarded and lost.

Figure 6:
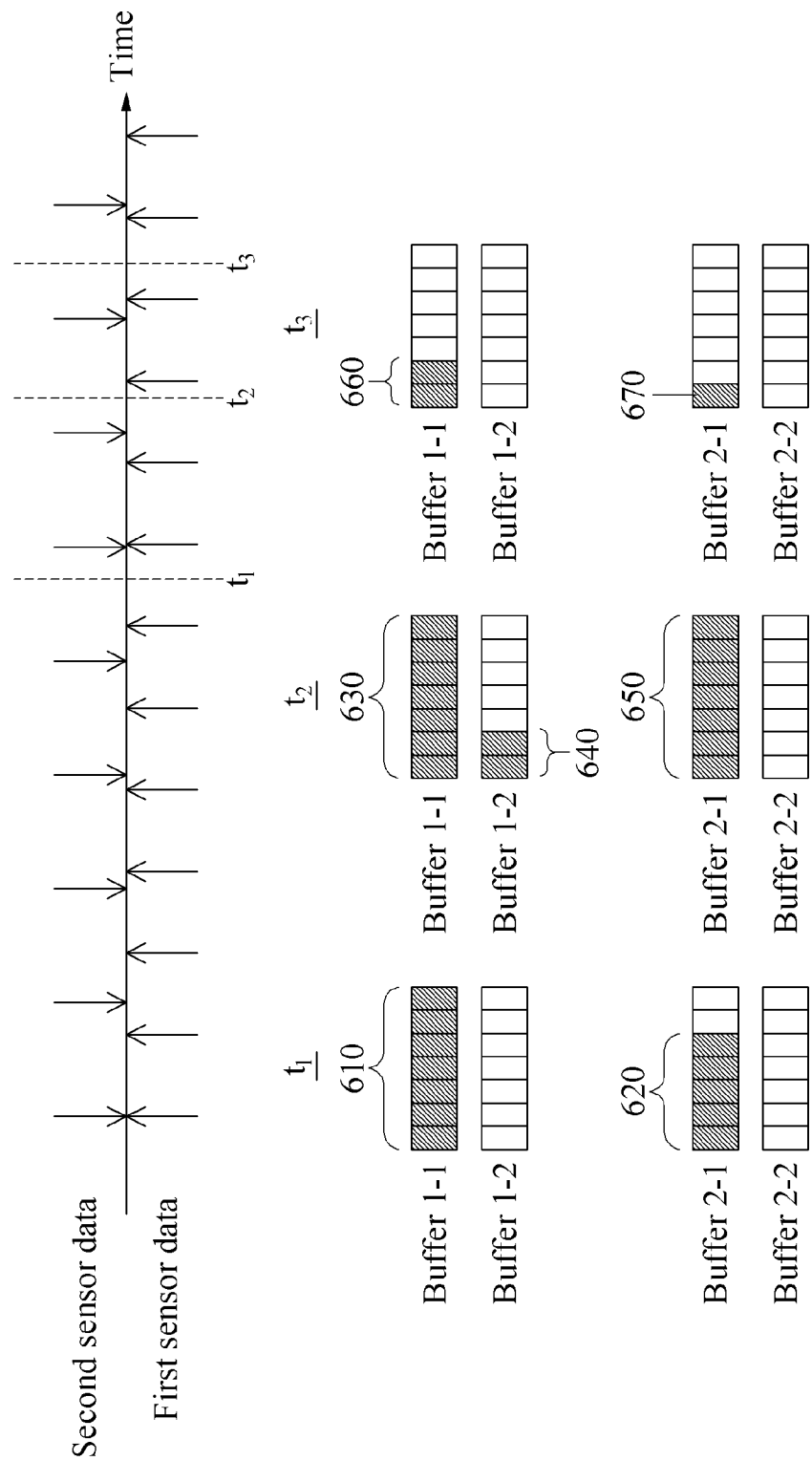
FIG. 6 illustrates an example of data preservation.

FIG. 6 illustrates an example of data preservation. The example of FIG. 6 illustrates a timing of storing first sensor data and a timing of storing second sensor data. These timings are chosen to help preserve data during the storing. For example, a dual-line buffer is used for the data preservation. The first sensor data is stored in a buffer 1-1, and a buffer 1-2 is used as a spare storage. Also, the second sensor data is stored in a buffer 2-1, and a buffer 2-2 is used as a spare storage. These spare storage buffers act as buffers that can help manage data reception when the other buffer is otherwise occupied.

As an example, when an actual sampling rate of the first sensor is higher than an actual sampling rate of the second sensor, data received in the buffer 1-1 is stored in the buffer 1-2 that is used as a spare buffer until a quantity of data corresponding to a preset ratio is stored in the buffer 2-1, after the quantity of data corresponding to the preset ratio is stored in the buffer 1-1.

In such an example, it is assumed that the application requests first sensor data and second sensor data in quantities corresponding to a ratio of 1:1. In this example, the application requests the first sensor data and the second sensor data, each having a quantity corresponding to a size of buffer or a greater size. In the example of FIG. 6, the first sensor data is received seven times and the second sensor data is received five times before a time $t_1$ occurs. Thus, at the time $t_1$, seven samples 610 are stored in the buffer 1-1, and five samples 620 are stored in the buffer 2-1. The first sensor data and the second sensor data are received twice, occurring from the time $t_1$ and a time $t_2$. In this example, samples 640 additionally received from the first sensor are stored in the buffer 1-2, and samples received from the second sensor are stored in the buffer 2-1. Through using this approach, seven samples 650 are stored in the second buffer.

Since the first sensor data and the second sensor data in a quantity corresponding to the size of buffer are stored at the time $t_2$, the samples 630 and the samples 650 are transferred to the application for the use of the application. In this example, the samples 640 corresponding to extra samples are also transferred to the application. When the application successfully receives all of the samples 630, the samples 640, and the samples 650, then the buffer 1-1. the buffer 1-2, the buffer 2-1, and the buffer 2-2 are initialized.

The application performs an operation using the samples 630, the samples 640, and the samples 650. Samples received while the application performs the operation are stored in the buffer 1-1 and the buffer 2-1. The first sensor data is received twice, while the second sensor data is received once from the time $t_2$ and a time $t_3$. Thus, at the time $t_3$, two samples 660 are stored in the buffer 1-1 and one sample 670 is stored in the buffer 2-1. Using a spare buffer, two or more items of sensor data may be synchronized without data loss.

Figure 7:
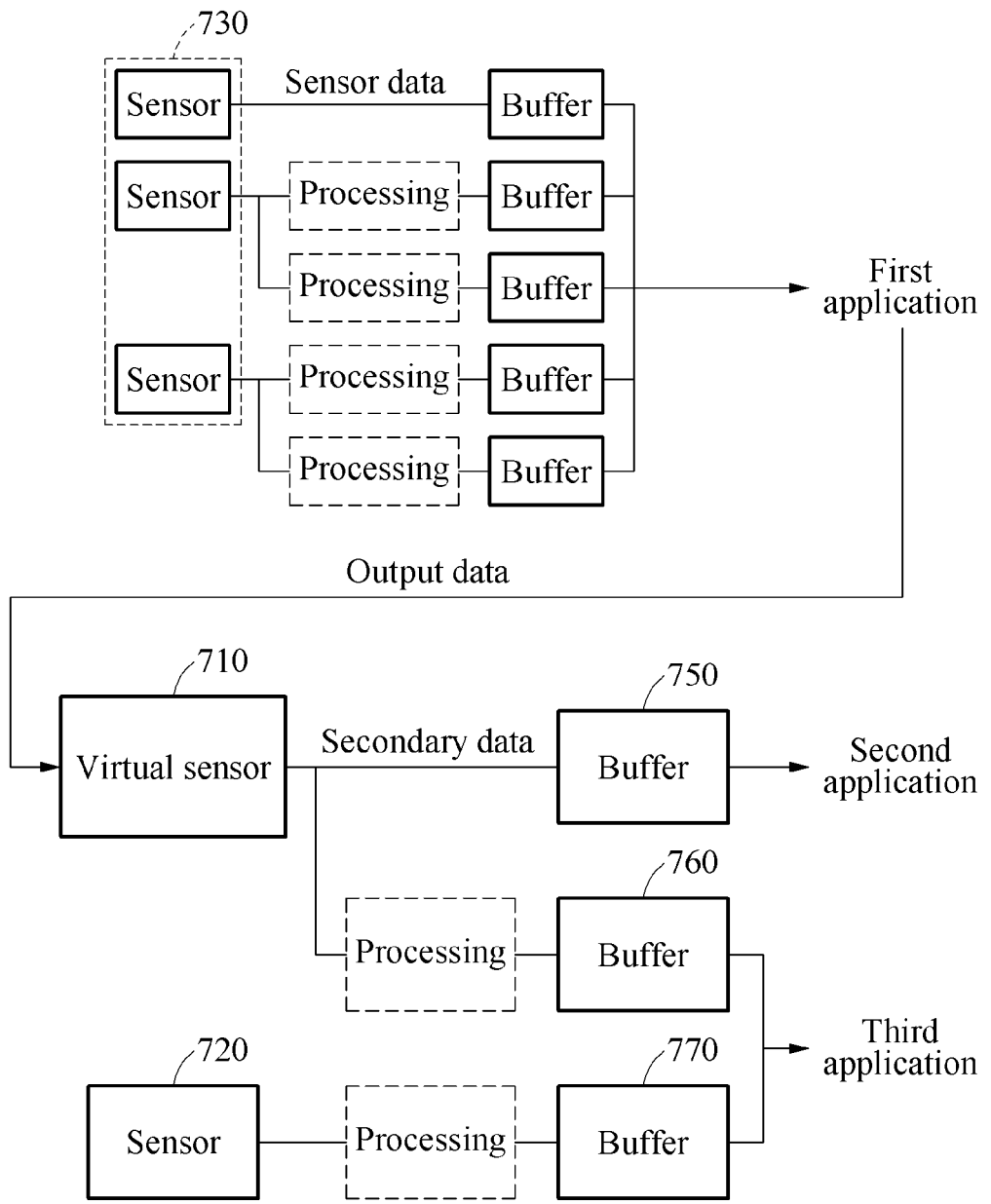
FIG. 7 illustrates an example of a generating of a virtual sensor.

FIG. 7 illustrates an example of generating a virtual sensor. Referring to the example of FIG. 7, a first application generates output data based on sensor data of sensors 730. As the foregoing discusses further, the sensor data is stored in a buffer to be transferred to the first application at preset intervals, and is processed before being stored in the buffer. Various other aspects of the buffering are discussed in greater detail, above. The first application generates the output data through an operation for generating processed sensor data and non-processed sensor data. When the first application is, for example, a blood pressure measuring application, the first application generates blood pressure data based on sensor data of an acceleration sensor, a pulse wave sensor, and an ECG sensor. In such an example, request information includes information associated with a type of output data. For example, such request information characterizes the sensor data in a way that facilitates managing and processing the sensor data. Accordingly, the first application specifies the type of output data using the request information. For example, the first application specifies the output data is to be identified as the blood pressure data. A data management apparatus then generates a virtual sensor 710 based on the type of output data. When the type of output data of the first application is the blood pressure data, the data management apparatus generates, for example, a virtual blood pressure sensor. Such a virtual blood pressure sensor accumulates the raw data provided by the physical sensors and combines and analyzes such data in a way that an application that accesses the virtual sensor is able to treat the data produced by the virtual sensor as if were an actual sensor designed to sense blood pressure directly.

The virtual sensor 710 generates secondary data based on the output data that is buffered and processed by the first application. The sensor data is data generated by an actual sensor 730, and the secondary data is data generated by the virtual sensor 710 for simulating a sensor. As the foregoing, the secondary data is data that is additionally generated based on the sensor data and thus, includes information obtained through a change in information indicated in the sensor data and other processing operations performed on the sensor data. Thus, the secondary data is generated through an operation, to be based on the sensor data. For example, output data is generated through performing a preset operation for sensor data, and secondary data is generated through a preset processing operation to manage the output data. For example, the operation for the secondary data is performed by a preset application such as the first application. A virtual sensor differs from sensors 730 and a configuration and properties of the same may be stored in a form of a memory module that acts to replicate the functionality of a given kind of sensor without physically including such a sensor. The data management device may generate or recreate and implement the virtual sensor based on such configuration and property information.

The secondary data is used in a manner similar to that for the raw sensor data. For example, the secondary data is stored in a buffer based on request information of applications and subsequently transferred to the applications. The virtual sensor 710 changes an attribute of the output data such that the output data is used as the sensor data. Also, the virtual sensor 710 performs a preset processing on the output data. For example, the virtual sensor 710 processes the output data such that the output data has a preset sampling rate and a preset resolution. However, these are only example and other types of processing of output data are used in other examples. For example, the data management apparatus adjusts a sampling rate and a resolution of the virtual sensor 710 based on the request information of the applications. The virtual sensor 710 is associated with characteristic information. Such characteristic information of the virtual sensor 710 is appropriately adjusted by the data management apparatus. For example, the characteristic information of the virtual sensor 710 is used to specify at least one of a type of the virtual sensor 710, the sampling rate of the virtual sensor 710, and the resolution of the virtual sensor 710. Hence, the characteristic information of the virtual sensor 710 facilitates receiving from the virtual sensor 710.

Accordingly, the data management apparatus provides the secondary data to the applications based on the characteristic information of the virtual sensor 710 and the request information of the applications. As an example, when a second application requests blood pressure data and the virtual sensor 710 operates as a virtual blood pressure sensor, the data management apparatus transfers the secondary data of the virtual sensor 710 to the second application through a buffer 750, as discussed further, above. In this manner, the virtual sensor 710 provides information to the second application as if it were an actual, dedicated blood pressure sensor. The secondary data is provided with sensor data of other sensors. For example, a third application requests both the blood pressure data and acceleration data. The virtual sensor 710 operates as the blood pressure sensor, and the sensor 720 operates as the acceleration sensor. The blood pressure data is transferred to the third application through a buffer 760 after an appropriate processing, and the acceleration data corresponding to the sensor data of the sensor 720 is transferred to the third application through a buffer 770 after the appropriate processing. The data management apparatus synchronizes the virtual sensor 710 and the sensor 720 by appropriately adjusting the sampling rate of the virtual sensor 710. Also, the data management apparatus synchronizes the virtual sensor 710 and the sensor 720 by discarding data received in the first buffer or the second buffer after data corresponding to a preset ratio is stored in the first buffer for the virtual sensor 710 and the second buffer for the sensor 720.

Figure 8:
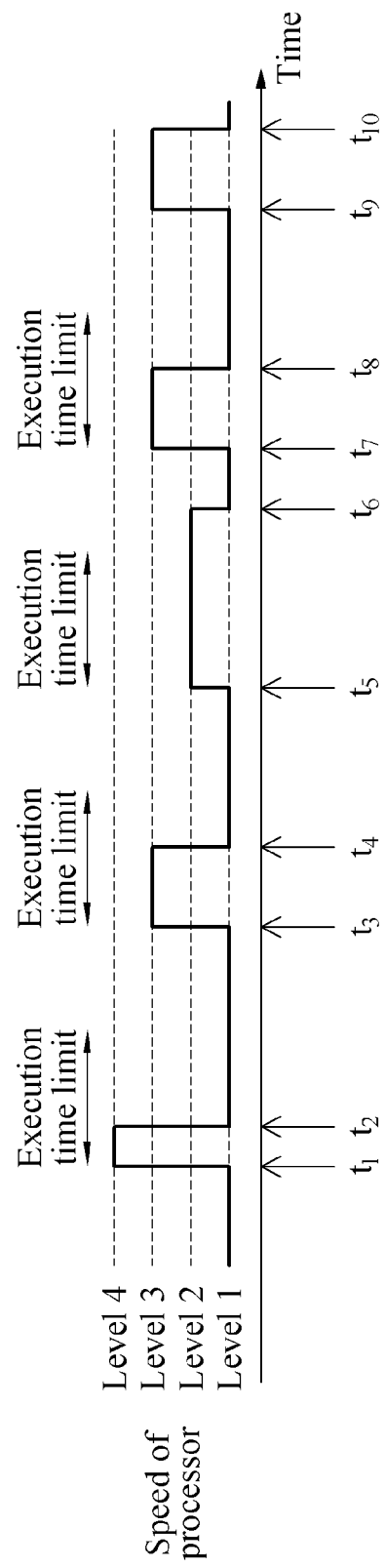
FIG. 8 illustrates an example of controlling a speed of a processor.

FIG. 8 illustrates an example of controlling a speed of a processor. As the foregoing discloses, the data management apparatus manages data for applications and thus, appropriately adjusts a speed of a processor for a desired purpose. Power consumption for driving the processor decreases according to a decrease in the speed of the processor. For example, when a speed of the processor for processing a corresponding operation is decreased by half, an amount of energy used for the corresponding operation is also decreased by half. Referring to the example of FIG. 8, the speed of the processor is adjusted to a level ranging between a level 2 and a level 4. The speed of the processor includes an operation clock of the processor. According to an increase in the level, the speed of the processor increases and the power consumption is reduced. Applications are executed by the processor. The applications have execution time limits for processing sensor data. Thus, the sensor data is processed within the execution time limits. Each of a time $t_1$, a time $t_3$, a time $t_5$, a time $t_7$, and a time $t_9$ indicates a point in time at which an application receives data from a buffer. Each of a time $t_2$, a time $t_4$, a time $t_6$, a time $t_8$, and a time $t_{10}$ indicates a point in time at which processing of the sensor data previously received from the buffer is completed. A period of time during which the application receives the data from the buffer and completes the processing of the sensor data is also referred to as, for example, an execution time. The execution time is acquired by measuring a time used by the application processing the sensor data at a current operational speed. When the processing of the sensor data is not performed, the processor generally operates at the level 1.

The data management apparatus controls the operational speed of the processor based on the execution time of the application for processing the sensor data and the execution time limit of the application. The data management apparatus decreases the operational speed of the processor when the execution time is shorter than the execution time limit. In an example of FIG. 8, a first execution time between the time $t_1$ and the time $t_2$ is shorter than the execution time limit and thus, the operational speed of the processor is decreased from the level 4 to the level 3. Also, a second execution time between the time $t_3$ and the time $t_4$ is shorter than the execution time limit, the operational speed of the processor is decreased from the level 3 to the level 2.

Also, the data management apparatus increases the operational speed when the execution time exceeds the execution time limit. In the example of FIG. 8, when a third execution time between the time $t_5$ and the time $t_6$ exceeds the execution time limit, the operational speed of the processor is increased from the level 2 to the level 3. When the execution time exceeds the execution time limit and the operational speed is increased, the operational speed of the processor is determined to be an operational speed corresponding to the most recently increased value. The data management apparatus reduces the power consumption by determining the operational speed of the processor so that it is to be minimized to fall within an acceptable range.

Figure 9:
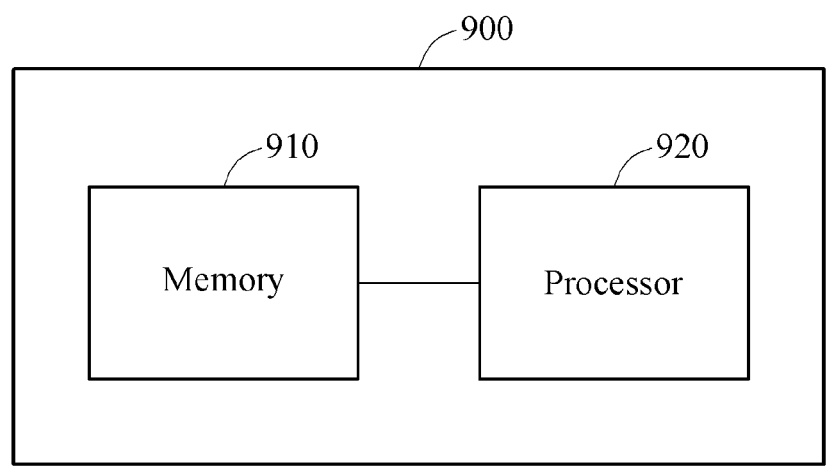
FIG. 9 illustrates another example of a data management apparatus.

FIG. 9 illustrates an example of a data management apparatus. Referring to FIG. 9, a data management apparatus 900 includes a memory 910 and a processor 920. However, these are only example elements, and other examples may include additional elements that are a part of the data management apparatus 900. For example, the memory 910 stores instructions to be implemented by the processor 920, where the instructors cause the processor to allocate a buffer for an application based on request information associated with data requested by the application, so as to store sensor data corresponding to the request information in the buffer, and to transfer the sensor data stored in the buffer to the application. Also, buffers are allocated for applications to use in the memory 910. The processor 920 may perform operations for data management using instructions stored in the memory 910. Also, the processor 920 executes various applications. Since the foregoing descriptions are applicable to here, repeated descriptions related to the memory 910 and the processor 920 are omitted for brevity. As only an example, the data management apparatus 900 may be configured to implement any, or any combination, of the data management apparatuses discussed herein, though embodiments are not limited thereto. Similar statements apply to other data management apparatuses disclosed, throughout, in that the examples presented herein are not intended to be limiting.

Figure 10:
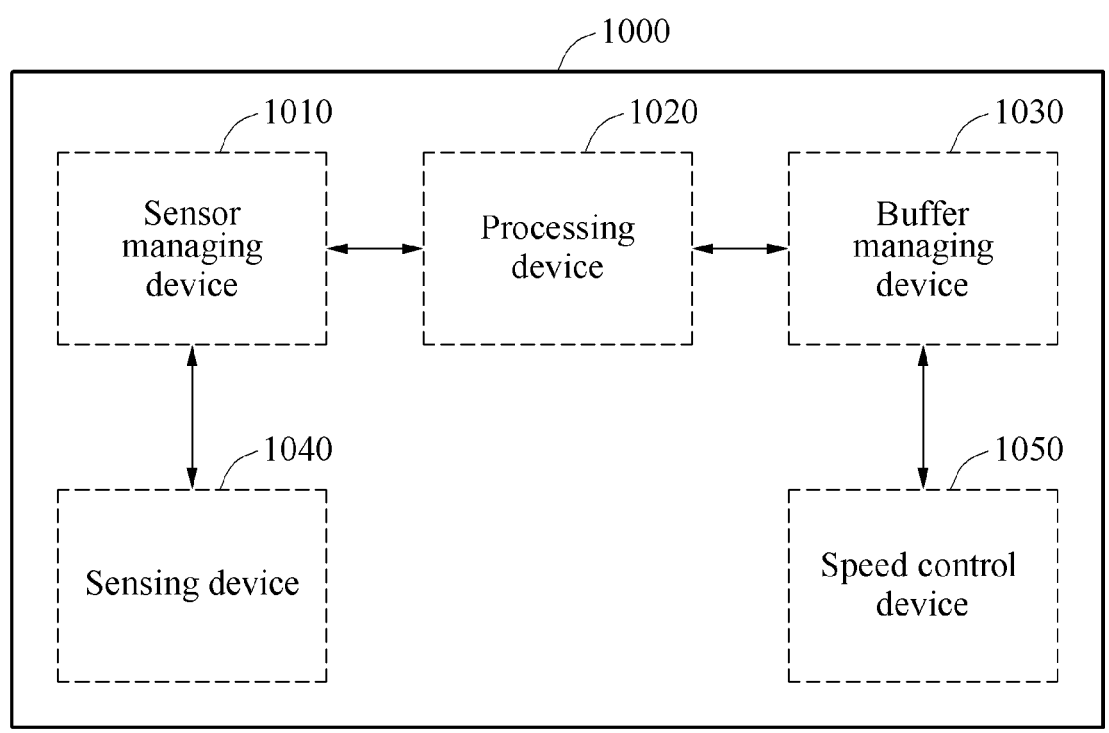
FIG. 10 illustrates an example of a processor, such as of a data management apparatus.

FIG. 10 illustrates an example of a processor. Referring to FIG. 10, a processor 1000 includes a sensor managing module or sensor managing device 1010, a processing module or processing device 1020, a buffer managing module or buffer managing device 1030, a sensing module or sensing device 1040, and a speed control module or speed controlling device 1050. The processor 1000 performs the data management using the sensor managing device 1010, the processing device 1020, the buffer managing device 1030, the sensing device 1040, and the speed control device 1050. Each of the sensor managing device 1010, the processing device 1020, the buffer managing device 1030, the sensing device 1040, and the speed control device 1050 may be implemented as a respective hardware module, such as a specialized processor. While FIG. 10 presents the processor 1000 as including several discrete structural devices or elements that individually carry out operations involved in the data management process carried out by the processor 1000, it will be apparent to one of ordinary skill in the art that the operations performed by these discrete structural devices or elements may be distributed for execution in different ways by the defined device elements. For example, the processor 1000 may be a single structural element configured to perform all of the operations described with each discrete structural device or element illustrated in FIG. 10.

The sensor managing device 1010 recognizes that sensor data is collected through a sensor. The sensor managing device 1010 verifies whether an application subscribing the sensor data is present. When the application subscribing the sensor data is present, the sensor managing module 1010 requests the sensing device 1040 to deliver the sensor data. The sensing device 1040 requests the sensor to transmit the sensor data and receives the sensor data. The sensing device 1040 transfers the received sensor data to the sensor managing device 1010. The sensor managing device 1010 transfers the sensor data to the processing device 1020 based on request information when a processing is to be performed. When the sensor data does not need to be processed, the sensor managing device 1010 directly transfers non-processed sensor data to the buffer managing device 1030.

The processing device 1020 generates a processing chain for each of the applications based on the request information. The processing device 1020 acquires processed sensor data by applying the processing chain to the sensor data and transfers the processed sensor data to the buffer managing device 1030.

The buffer managing device 1030 allocates a buffer for each of the applications, and stores the processed sensor data or the non-processed sensor data in the buffer allocated for each of the applications. When a quantity of sensor data requested by the application using the request information in a process of registration is collected, the buffer managing device 1030 records a current time by announcing that the quantity of sensor data is collected to the speed control device 1050 and sets an optimal processor speed based on an execution time history of the application. Also, when the quantity of sensor data requested by the application through the request information in a process of registration is collected, the buffer managing device 1030 transfers the collected sensor data to the application. The buffer managing device 1030 releases the buffer when the application completes tasks corresponding to the sensor data. The buffer managing device 1030 announces that the application completes the tasks to the speed control device 1050. The speed control device 1050 updates an execution time to update the optimal processor speed.

Figure 11:
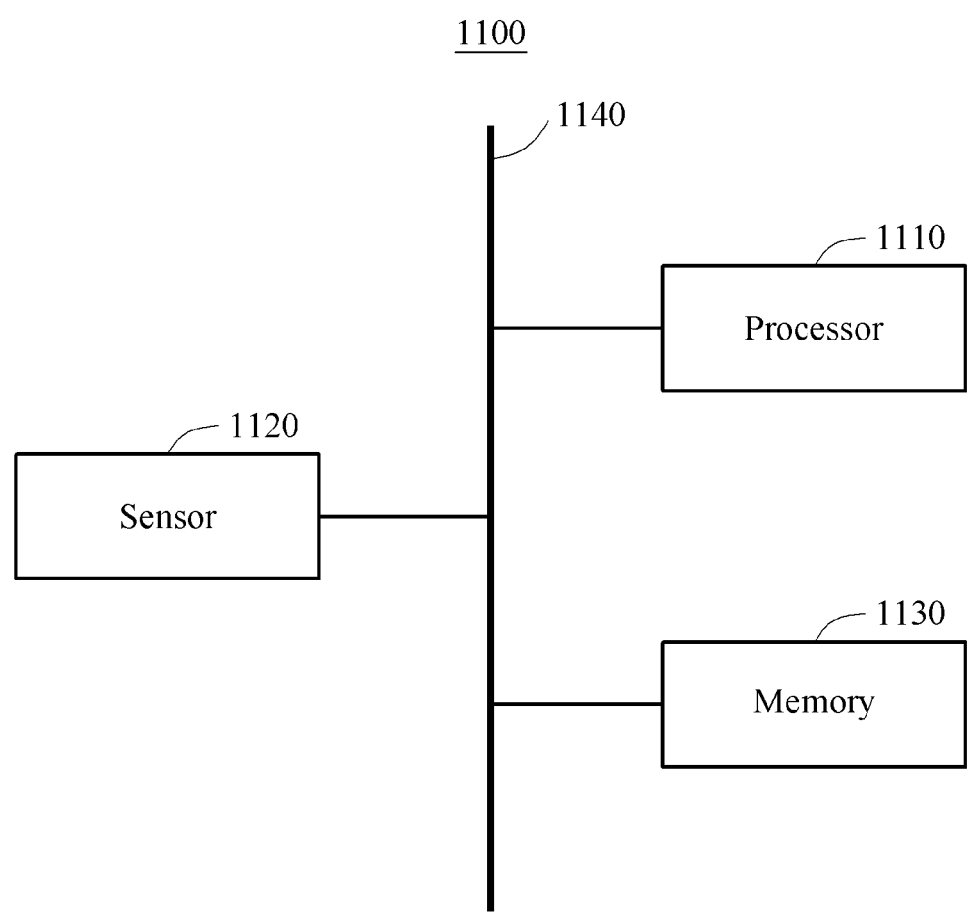
FIG. 11 illustrates an example of an electronic device.

FIG. 11 illustrates an example of an electronic device. Referring to FIG. 11, an electronic device 1100 includes a processor 1110, a sensor 1120, and a memory 1130. The processor 1110, the sensor 1120, and the memory 1130 may communicate with one another through a bus 1140, or may communicate through another approach, such as wirelessly. The sensor 1120 outputs various sensor data. For example, the sensor 1120 outputs sensor data associated with a biosignal of a user. Also, the sensor 1120 senses, for example, a temperature of the processor 1110, a state of charge (SOC) of a battery, an ECG of the user, senses a pulse wave of the user, body impedance of the user, an acceleration, and a gradient. However, these are only examples, and other appropriate information may be acquired by the sensor 1120. For example, the sensor 1120 generates sensor data based on various available schemes. As discussed further in the foregoing, the sensor data is stored in an allocated buffer in the memory 1130.

The processor 1110 includes at least one device described with reference to FIG. 1 through FIG. 10, or performs at least one method, or any combination of the same, described with reference to FIGS. 1-10 and 12-14. The processor 1110 executes an application and controls the electronic device 1100. Instructions for executing the application are stored in the memory 1130. The electronic device 1100 is connected to an external device, for example, a PC and a network through an input and output device in order to perform a data exchange.

In an example, the electronic device 1100 is a portable device, for example, a smartphone, a tablet PC, and a laptop computer, or a wearable device, for example, a smart watch, a smart band, and a smart necklace. However, these are only examples and the electronic device 1100 may be a different portable device in other examples. The electronic device 1100 provides various information associated with a body state to a user based on a biosignal of the user measured through the sensor 1120.

Figure 12:
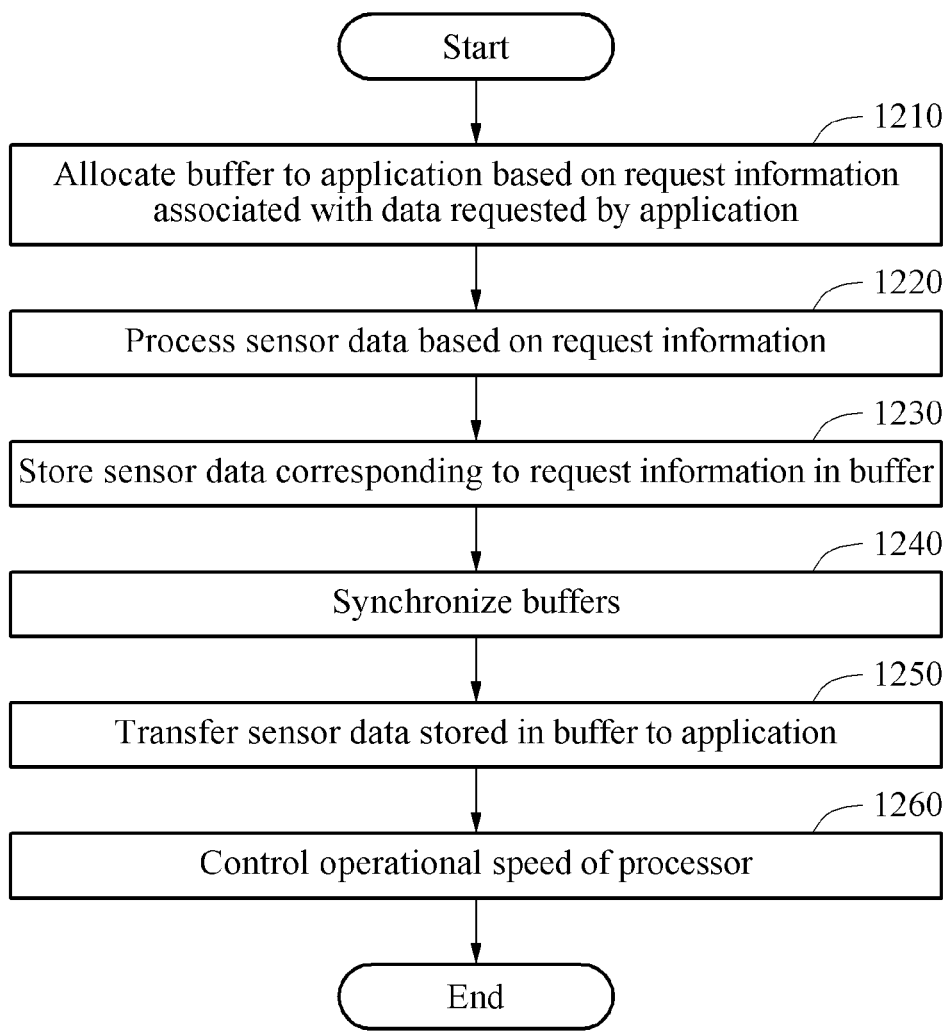
FIG. 12 illustrates an example of a data management method.

FIG. 12 illustrates an example of a data management method.

Referring to FIG. 12, in operation 1210, the method allocates a buffer to an application based on request information associated with data requested by the application. For example, a data management apparatus, such as any of the above discussed data management apparatuses, allocates a buffer to an application based on request information associated with data requested by the application. In operation 1220, the method processes sensor data based on the request information. For example, the data management apparatus processes sensor data based on the request information. In operation 1230, the method stores sensor data corresponding to the request information in the buffer. For example, the data management apparatus stores sensor data corresponding to the request information in the buffer. In operation 1240, the method synchronizes buffers. For example, data management apparatus synchronizes buffers. In operation 1250, the method transfers the sensor data stored in the buffer to the application. For example, the data management apparatus transfers the sensor data stored in the buffer to the application. In operation 1260, the method controls an operational speed of a processor. For example, the data management apparatus controls an operational speed of a processor.

Figure 13:
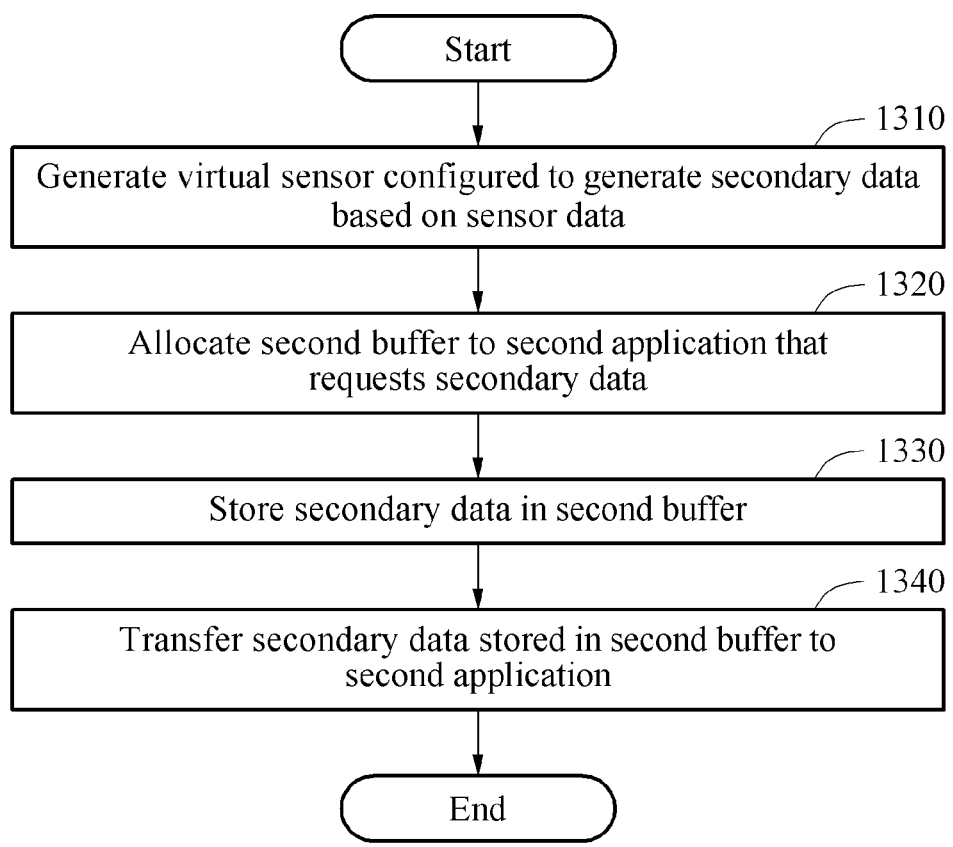
FIG. 13 illustrates an example of a data management method.

FIG. 13 illustrates another example of a data management method. Referring to FIG. 13, in operation 1310, the method generates a virtual sensor configured to generate secondary data based on sensor data. For example, a data management apparatus, such as any of the above discussed data management apparatuses, generates a virtual sensor configured to generate secondary data based on sensor data. In operation 1320, the method allocates a second buffer to a second application that requests the secondary data. For example, the data management apparatus allocates a second buffer to a second application that requests the secondary data. In operation 1330, the method stores the secondary data in the second buffer. For example, the data management apparatus stores the secondary data in the second buffer. In operation 1340, the method transfers the secondary data stored in the second buffer to the second application. For example, the data management apparatus transfers the secondary data stored in the second buffer to the second application.

Figure 14:
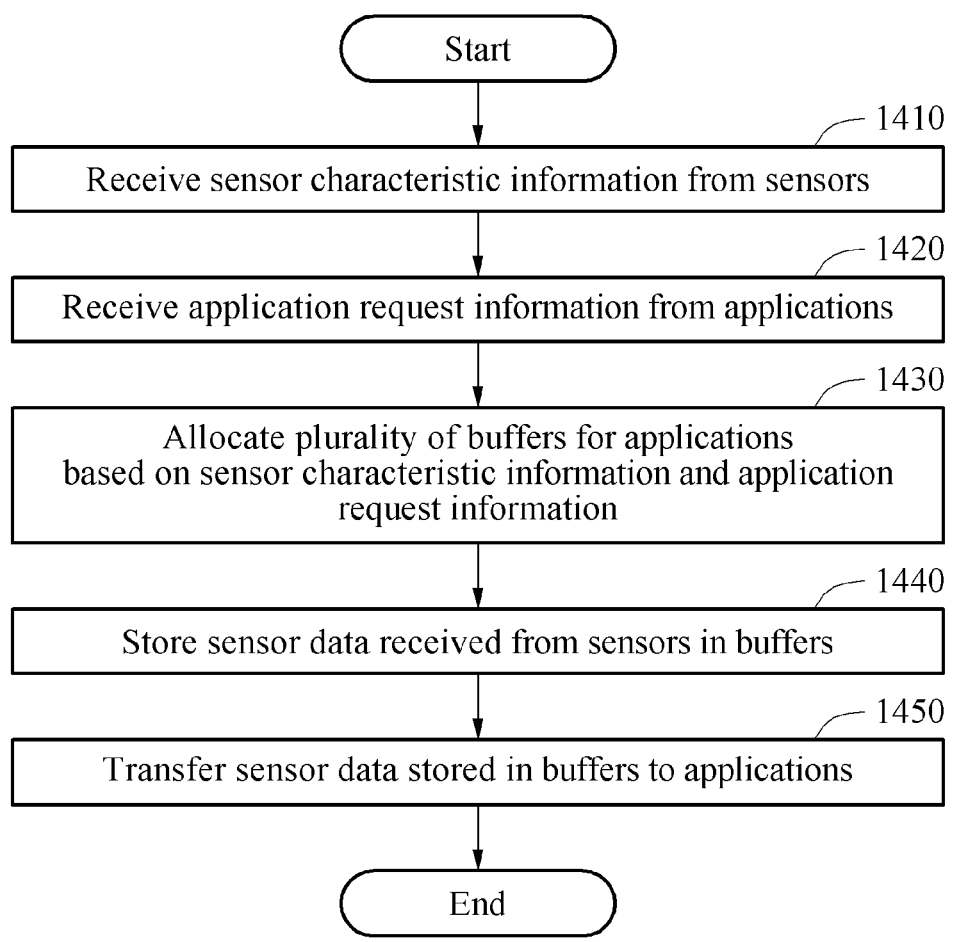
FIG. 14 illustrates an example of a data management method.

FIG. 14 illustrates still another example of a data management method. Referring to FIG. 14, in operation 1410, the method receives sensor characteristic information from sensors. For example, a data management apparatus, such as any of the above discussed data management apparatuses, receives sensor characteristic information from sensors. In operation 1420, the method receives application request information from applications. For example, the data management apparatus receives application request information from applications. In operation 1430, the method allocates buffers for the applications based on sensor characteristic information and the application request information. For example, the data management apparatus allocates buffers for the applications based on sensor characteristic information and the application request information. In operation 1440, the method stores sensor data received from the sensors in the buffers. For example, the data management apparatus stores sensor data received from the sensors in the buffers. In operation 1450, the method transfers the sensor data stored in the buffers to the applications. For example, the data management apparatus transfers the sensor data stored in the buffers to the applications.

The apparatuses, units, modules, devices, and other components illustrated in FIGS. 1-14 that perform the operations described herein with respect to FIGS. 1-14 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-14. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described herein with respect to FIGS. 1-14 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A data management method comprising:
   receiving corresponding quantity information indicating a quantity of data to be transferred from each buffer of buffers at a time point;
   allocating the buffers for an application based on request information associated with data requested by the application, wherein the buffers comprise a first buffer dedicated to storing first sensor data generated by a first sensor and a second buffer dedicated to storing second sensor data generated by a second sensor;
   storing sensor data corresponding to the request information in the buffers;
   synchronizing the first buffer and the second buffer such that a ratio based on an amount of the first sensor data stored in the first buffer and an amount of the second sensor data stored in the second buffer corresponds to a reference ratio requested by the application; and
   in response to an amount of the sensor data stored in the first or second buffer exceeding the corresponding quantity, transferring the sensor data stored in the corresponding first or second buffer to the application,
   wherein the synchronizing comprises
   discarding the first sensor data received in the first buffer until the amount of the second sensor data corresponding to the ratio is stored in the second buffer after the amount of the first sensor data corresponding to the ratio is stored in the first buffer, or
   storing the first sensor data received in the first buffer in a spare buffer until the amount of the second sensor data corresponding to the ratio is stored in the second buffer after the amount of the first sensor data corresponding to the ratio is stored in the first buffer.

2. The data management method of claim 1, wherein the request information comprises information comprising any one or any combination of any two or more of a type of the data requested by the application, a type of processing to be performed on the data, or the quantity of the data.

3. The data management method of claim 1, wherein the storing comprises storing the sensor data corresponding to the request information in the buffers based on characteristic information of a corresponding sensor and the request information.

4. The data management method of claim 3, wherein the characteristic information comprises any one or any combination of any two or more of a type of the sensor, a sampling rate of the sensor, or a resolution of the sensor.

5. The data management method of claim 1, wherein each buffer comprises either one or both of a line or a channel.

6. The data management method of claim 5, wherein each buffer comprises a first line and a second line, and
sensor data is received and stored in the second line during a first interval, and previously received and stored sensor data in the first line is transferred to the application during the first interval.

7. The data management method of claim 5, wherein each buffer comprises a first channel in which a first processing is performed on first sensor data and resulting processed first sensor data is stored, and a second channel in which a second processing is performed on second sensor data and resulting processed second sensor data is stored.

8. The data management method of claim 1, further comprising:
generating a virtual sensor configured to generate secondary data based on the sensor data.

9. The data management method of claim 8, wherein the virtual sensor is configured to generate the secondary data based on an output of the application.

10. The data management method of claim 8, further comprising:
allocating a third buffer for a second application that requests the secondary data;
storing the secondary data in the third buffer; and
transferring the secondary data stored in the third buffer to the second application.

11. The data management method of claim 1, further comprising:
controlling a processing speed of a processor based on an execution time during which the application processes the sensor data and an execution time limit of the application.

12. The data management method of claim 11, wherein the controlling of the processing speed comprises:
acquiring the execution time by measuring a time used by the application to process the sensor data at a current operational speed;
decreasing the processing speed of the processor in response to the execution time being determined to be less than the execution time limit; and
increasing the processing speed of the processor in response to the execution time being determined to be greater than the execution time limit.

13. The data management method of claim 1, further comprising:
processing the sensor data based on the request information before the transferring to the application.

14. The data management method of claim 13, wherein the processing comprises performing any one or any combination of any two or more of filtering, delaying, differentiation, interpolation, or decimation on the sensor data.

15. A non-transitory computer-readable storage medium storing instructions that, when executed by a processor, cause the processor to perform the method of claim 1.

16. A data management apparatus comprising:
a buffer managing device configured to allocate a buffers for an application based on request information associated with data requested by the application, wherein the buffers comprise a first buffer dedicated to storing first sensor data generated by a first sensor and a second buffer dedicated to storing second sensor data generated by a second sensor,
wherein the buffer managing device is further configured to synchronize the first buffer and the second buffer such that a ratio based on an amount of the first sensor data stored in the first buffer and an amount of the second sensor data stored in the second buffer corresponds to a reference ratio requested by the application,
wherein the buffer managing device is further configured to
discard the first sensor data received in the first buffer until the amount of the second sensor data corresponding to the ratio is stored in the second buffer after the amount of the first sensor data corresponding to the ratio is stored in the first buffer, or
store the first sensor data received in the first buffer in a spare buffer until the amount of the second sensor data corresponding to the ratio is stored in the second buffer after the amount of the first sensor data corresponding to the ratio is stored in the first buffer;
a sensor managing device configured to store sensor data corresponding to the request information in the buffers; and
a processing device configured to
receive corresponding quantity information indicating a quantity of data to be transferred from each buffer of the buffers at a time point, and
in response to an amount of the sensor data stored in the first or second buffer exceeding the corresponding quantity, transfer the sensor data stored in the corresponding first or second buffer to the application.

17. The data management apparatus of claim 16, further comprising:
a memory configured to store instructions to be executed by the processing device.

18. The data management apparatus of claim 16, wherein the request information comprises any one or any combination of any two or more of a type of the data requested by the application, a type of processing to be performed on the data, or the quantity of the data.

19. The data management apparatus of claim 16, wherein the sensor managing device is configured to store the sensor data corresponding to the request information in the buffers based on characteristic information of a sensor and the request information.

20. The data management apparatus of claim 16, wherein the buffers each comprise either one or both of a line or a channel.

21. The data management apparatus of claim 16, wherein the processing device is further configured to generate a virtual sensor configured to generate secondary data based on the sensor data.

22. The data management apparatus of claim 16, further comprising a speed control device configured to control a processing speed of the processing device based on an execution time during which the application processes the sensor data and an execution time limit of the application.

23. The data management apparatus of claim 16, wherein the processing device is further configured to process the sensor data based on the request information.

* * * * *